US007878288B2

(12) United States Patent
Kostak et al.

(10) Patent No.: US 7,878,288 B2
(45) Date of Patent: Feb. 1, 2011

(54) SWING-OUT JOYSTICK

(75) Inventors: Ales Kostak, Porici nad Sazavou (CZ); Jaroslav Fiser, Pribram VII (CZ)

(73) Assignee: Clark Equipment Company, West Fargo, ND (US)

( * ) Notice: Subject to any disclaimer, the term of this patent is extended or adjusted under 35 U.S.C. 154(b) by 283 days.

(21) Appl. No.: 12/049,073

(22) Filed: Mar. 14, 2008

(65) Prior Publication Data

US 2009/0230749 A1    Sep. 17, 2009

(51) Int. Cl.
*B60K 26/02* (2006.01)
*B62D 1/02* (2006.01)

(52) U.S. Cl. .................. 180/331; 180/329; 180/330

(58) Field of Classification Search .............. 180/315, 180/334, 326, 329, 331, 321, 324, 333, 330; 297/411.37, 411.38, 411.31, 411.32, 411.35, 297/411.36; 187/224, 227, 233
See application file for complete search history.

(56) References Cited

U.S. PATENT DOCUMENTS

| 2,618,447 | A | * | 11/1952 | Lecarme | 244/231 |
|---|---|---|---|---|---|
| 4,140,200 | A | * | 2/1979 | Tucek | 180/333 |
| 4,225,183 | A | * | 9/1980 | Hanagan et al. | 297/411.31 |
| 4,478,308 | A | * | 10/1984 | Klaassen | 180/326 |
| 4,702,520 | A | * | 10/1987 | Whisler et al. | 297/411.36 |
| 4,730,691 | A | * | 3/1988 | Grigg | 180/329 |
| 5,566,778 | A | * | 10/1996 | Valier et al. | 180/334 |
| 5,924,515 | A | | 7/1999 | Stauffer | |
| 6,148,688 | A | | 11/2000 | Nishimaki | |
| 6,170,598 | B1 | * | 1/2001 | Furukawa | 180/334 |
| 6,550,560 | B2 | | 4/2003 | Carleton | |
| 6,564,896 | B1 | * | 5/2003 | Proksch et al. | 180/326 |
| 6,585,073 | B2 | | 7/2003 | Lorenz | |
| 6,646,891 | B2 | | 11/2003 | Kim | |
| 6,898,496 | B2 | * | 5/2005 | Chernoff et al. | 701/41 |
| 6,971,194 | B2 | | 12/2005 | McClelland et al. | |
| 7,036,250 | B2 | * | 5/2006 | Dressler et al. | 37/466 |
| 2001/0048220 | A1 | | 12/2001 | Lorenz | |
| 2004/0140145 | A1 | * | 7/2004 | Chernoff et al. | 180/333 |
| 2004/0245835 | A1 | * | 12/2004 | Diffrient | 297/411.37 |

(Continued)

FOREIGN PATENT DOCUMENTS

JP    10280481    10/1998

(Continued)

OTHER PUBLICATIONS

Machine Translation of JP 10-280481.*

(Continued)

*Primary Examiner*—Paul N. Dickson
*Assistant Examiner*—George D. Spisich
(74) *Attorney, Agent, or Firm*—John D. Veldhuis-Kroeze; Westman, Champlin & Kelly, P.A.

(57) ABSTRACT

An operator control assembly includes an operator manipulable control, and a first armrest movably coupling the operator manipulable control to a frame of a construction vehicle. The first armrest is movable from a first vertical orientation to a second vertical orientation and from a first horizontal orientation to a second horizontal orientation, such that when the armrest is in the second horizontal orientation, the armrest is positioned with in a footprint of the vehicle.

16 Claims, 11 Drawing Sheets

U.S. PATENT DOCUMENTS

| | | |
|---|---|---|
| 2006/0042857 A1* | 3/2006 | Catton et al. ............... 180/334 |
| 2006/0232116 A1* | 10/2006 | Jang et al. ............... 297/354.1 |
| 2007/0017728 A1* | 1/2007 | Sano ............... 180/334 |
| 2008/0066900 A1* | 3/2008 | Saebi et al. ............... 166/51 |

FOREIGN PATENT DOCUMENTS

| | | |
|---|---|---|
| JP | 102521000 | 10/1998 |
| JP | 2000328604 | 11/2000 |

OTHER PUBLICATIONS

Search Report and Written Opinion dated Jun. 8, 2009 for International application No. PCT/US32009/001555, filed Mar. 12, 2009.

* cited by examiner

SWING-OUT JOYSTICK

BACKGROUND

The present invention relates to a tracked construction vehicle that has an adjustable width to move through narrow spaces.

SUMMARY

In one embodiment, the invention provides an operator control assembly for a construction vehicle. The operator control assembly includes an operator manipulable control, and a first armrest movably coupling the operator manipulable control to a frame of a construction vehicle. The first armrest is movable from a first vertical orientation to a second vertical orientation and from a first horizontal orientation to a second horizontal orientation, such that when the armrest is in the second horizontal orientation, the armrest is positioned with in a footprint of the vehicle.

In another embodiment, the invention provides a seating assembly for a construction vehicle. The seating assembly includes an operator seat, a frame supporting the operator seat, a first armrest movably coupled to the frame, such that the first armrest is movable from a first vertical orientation to a second vertical orientation and from a first horizontal orientation to a second horizontal orientation, and an operator manipulable control coupled to the first armrest.

In yet another embodiment the invention provides a method of adjusting an armrest on a construction vehicle. The method includes pivoting the armrest upward from a first vertical orientation into a second vertical orientation prior to entering the vehicle, disengaging controls from the armrest when in the second vertical orientation, pivoting the armrest downwards into the first vertical orientation, and engaging the controls and the armrest when in the first vertical orientation. The method further includes pivoting the armrest horizontally inward from a first horizontal orientation into a second horizontal orientation, inserting a pin into an aperture in the armrest, retaining the armrest in the second horizontal orientation, pivoting the armrest upward, removing the pin from the aperture in the armrest and biasing the armrest outward into the first horizontal orientation.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
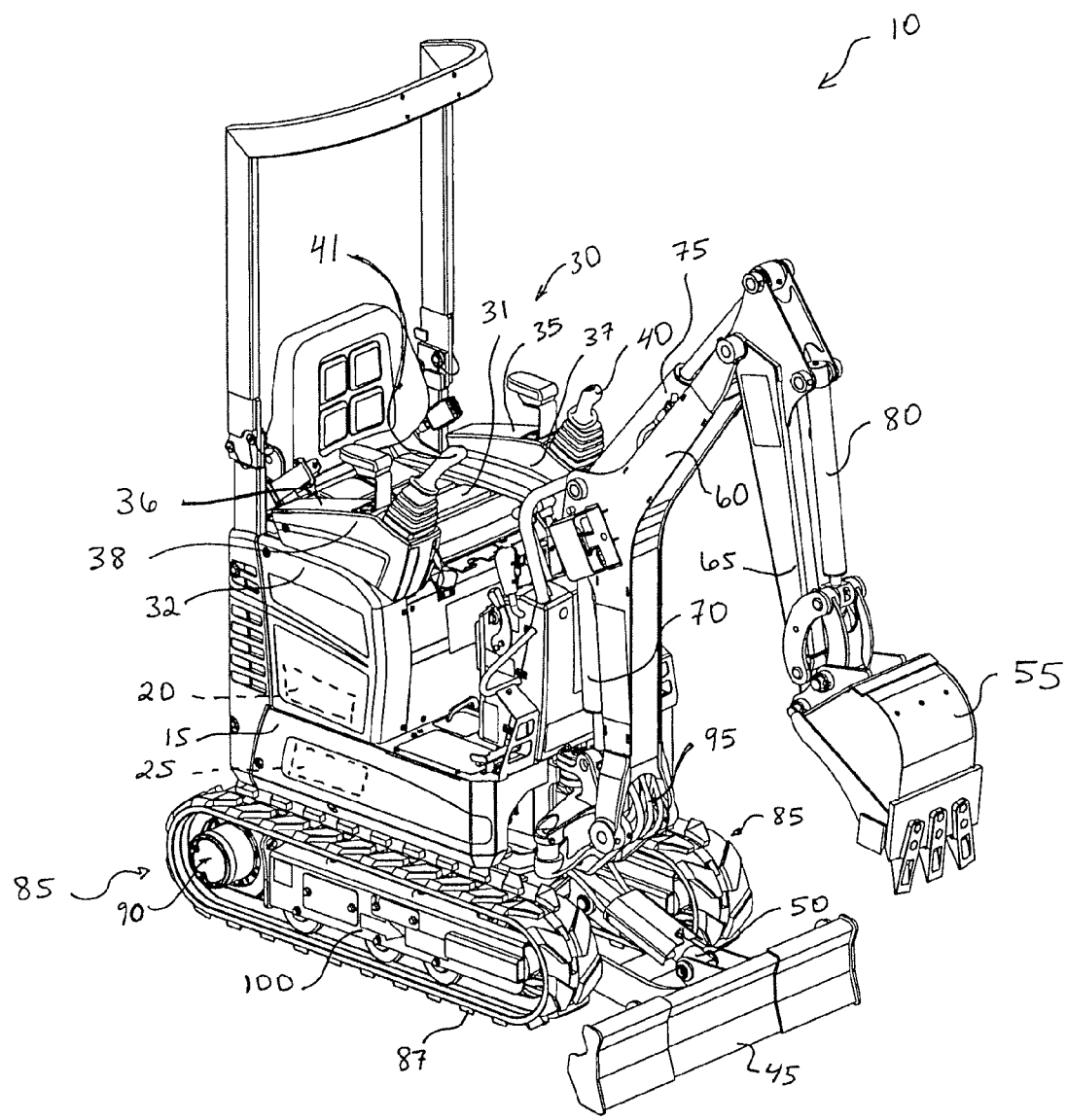
FIG. 1 is a perspective view of a construction vehicle in accordance with the present invention.

FIG. 1 illustrates an excavator-type construction vehicle 10 that is compact and can be referred to as a mini excavator. The excavator 10 includes a body 15 supporting an engine 20 and a hydraulic system 25. The engine 20 and hydraulic system 25 are operable to provide power and hydraulic fluid to move and operate the excavator 10. The engine 20 and hydraulic system 25 can be positioned below an operator support 30.

The operator support 30 includes a seat 31 supported on a frame 32 and first and second armrests 35, 36 coupled to the frame 32. First and second armrests 35, 36 are supported on the left and right sides of the seat 31. The armrests 35, 36 are covered by armrest cover plates 37, 38 respectively, to substantially conceal interior portions of the armrests 35, 36. A plurality of operator manipulable controls, such as the illustrated joysticks 40, 41, are positioned on the respective armrests 35, 36 and are operable to control operation of the excavator 10.

A lower attachment, such as the illustrated dozer blade 45 is pivotably coupled to the body 15. A dozer lift cylinder 50 is coupled between the body 15 and the dozer blade 45 for pivoting the dozer blade 45 with respect to the body 15. The dozer blade 45 is positioned in front of the excavator 10 to help create a smooth path of travel and to perform other tasks.

An upper attachment, such as the illustrated bucket 55, is coupled to the body 15 by a boom arm 60 and an attachment arm 65. The boom arm 60 is pivotably coupled to the body 15 and is pivoted relative to the body 15 by a first lift cylinder 70. The attachment arm 65 is pivotably coupled to the boom arm 60 and is pivoted about the boom arm 60 by a second lift cylinder 75. The bucket 55 is pivotably coupled to the attachment arm 65 and is pivoted about the attachment arm 65 by a tilt cylinder 80.

The excavator 10 further includes left and right track assemblies 85 that are operable to support and move the excavator 10. The track assemblies 85 each include a track 87 and a track drive unit 90 for driving movement of the track 87. The track drive units 90 are driven by the engine 20 and the hydraulic system 25 through a plurality of conduits 95. The track drive units 90 can be motors or any other similar mechanism that receives an input of pressurized fluid and generates an output of mechanical movement. The track drive units 90 drive left and right tracks assemblies 85 to move the excavator 10 over a ground surface. The track assemblies 85 can further include a frame plate 100 to at least partially cover the interior of the track assemblies 85 to inhibit entry of debris.

Figure 2:
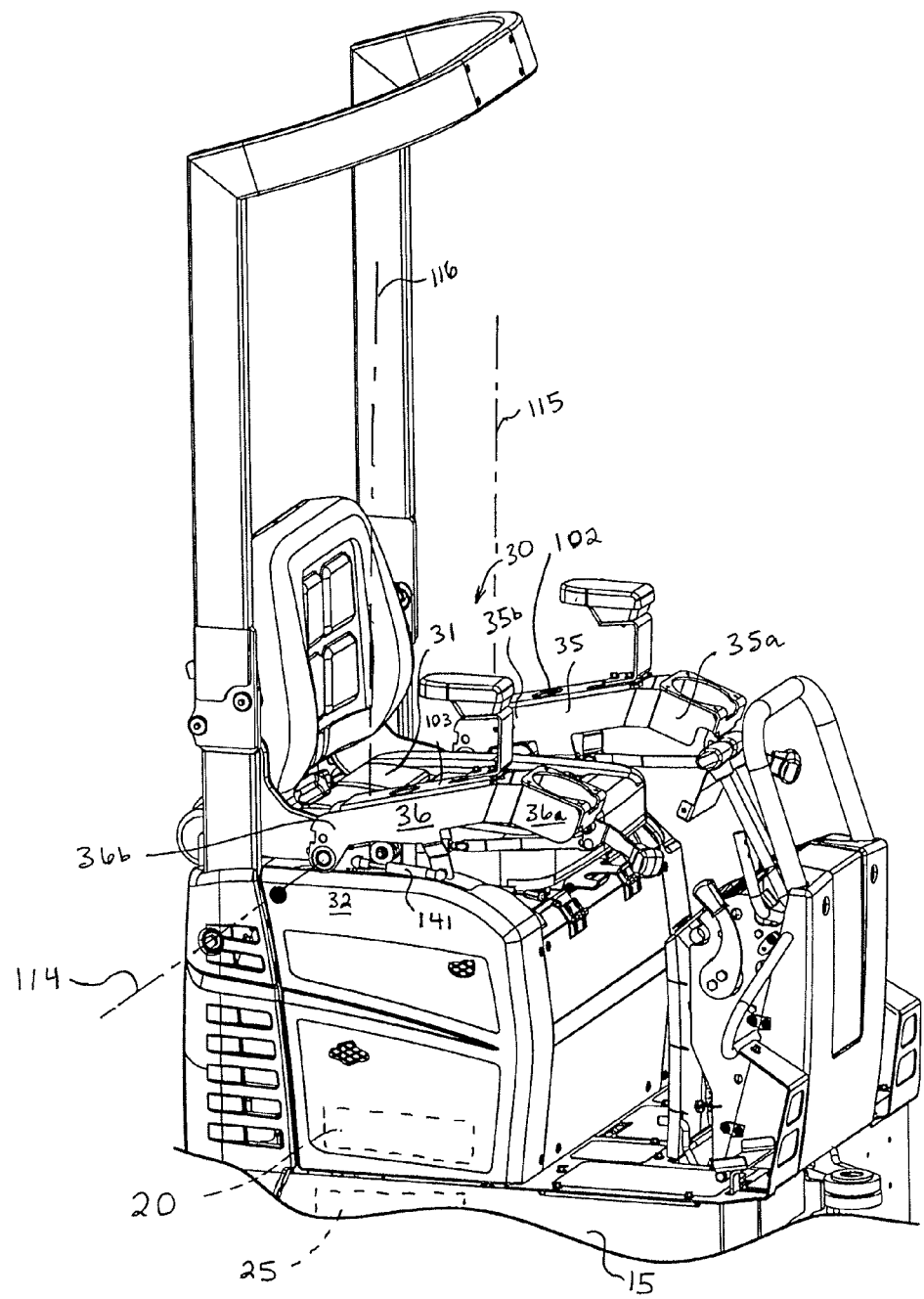
FIG. 2 is a perspective view of the vehicle of FIG. 1 with a portion cutaway to reveal a pair of armrests in a first vertical orientation.
Figure 3:
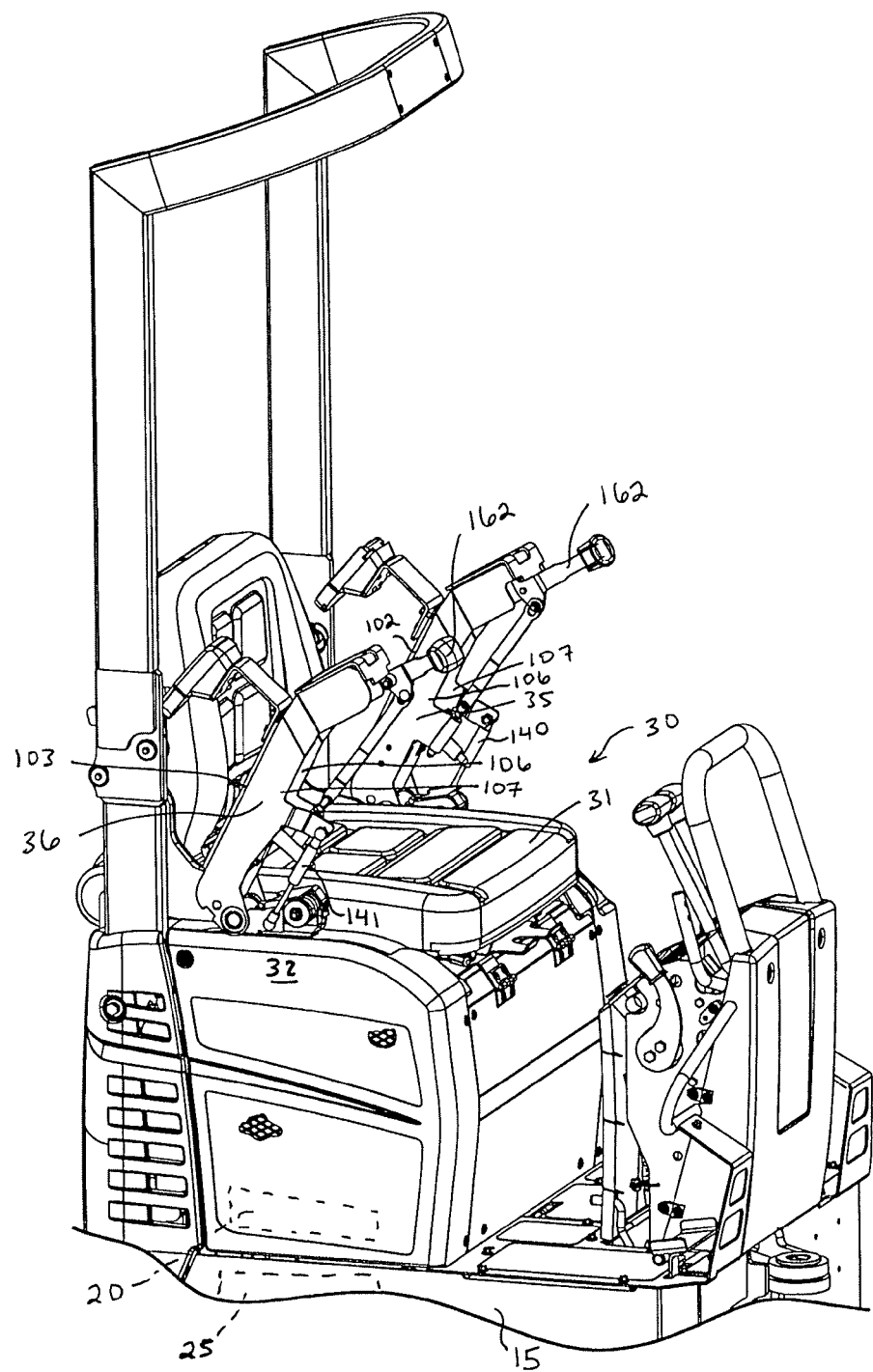
FIG. 3 is a perspective view of the vehicle of FIG. 2 with the pair of armrests in a second vertical orientation.

In FIGS. 2 and 3, the armrest cover plates 37, 38 and joysticks 40, 41 are removed to more clearly illustrate the first and second armrests 35, 36. The first and second armrests 35, 36 have first ends 35*a*, 36*a* that can include various operator controls, such as joysticks 40, 41 (see FIG. 1). The armrests 35, 36 have second ends 35*b*, 36*b* that are pivotably coupled to the frame 32 about axes 113, 114, respectively. In other embodiments, the second ends 35*b*, 36*b* are pivotably coupled to the body 15. The armrests 35, 36 each have an upper member 102, 103 that is substantially horizontally oriented for supporting the arm of an operator and a pair of inner and outer spaced apart side members 106, 107 extending from the upper member 102, 103 to define a channel 110, 111 beneath the upper member 102, 103. The side members 106, 107 are illustrated for the right armrest 36 in FIGS. 6, 7 and 11. The side members 106, 107 for the left armrest 36 are illustrated, but not labeled in FIG. 3. In the illustrated embodiment, the axes 113, 114 are co-linear. The side members 106, 107 on armrest 35 are a substantially identical minor-image of the inner and outer side members 106, 107 on armrest 36.

The armrests 35, 36 are pivotable about respective, generally horizontal axes 113, 114 (shown in FIGS. 4 and 5) from a first vertical orientation, shown in FIG. 2, to a second vertical orientation, shown in FIG. 3. In the illustrated embodiment, the axes 113, 114 are co-linear. In the first vertical orientation, the armrests 35, 36 are lowered to support an operator's arms comfortably thereon. When an operator is entering or exiting the operator support 30, the armrests 35, 36 are moved to the second vertical or non-working orientation, as shown in FIG. 3 for ease of access. When in the second vertical orientation, the controls 40, 41 can be non-operational to inhibit accidental actuation of the controls 40, 41 while an operator is entering or exiting the operator support 30. In some embodiments, additional aspects of this vehicle 10 are non-operational or locked when the armrests 35, 36 are in the second vertical orientation. In some embodiments, the generally horizontal axes 113, 114 are angled relative to one another (see, for example, FIG. 4), whereas in other embodiments, the generally horizontal axes 113, 114 are parallel (see, for example, FIG. 5).

Figure 4:
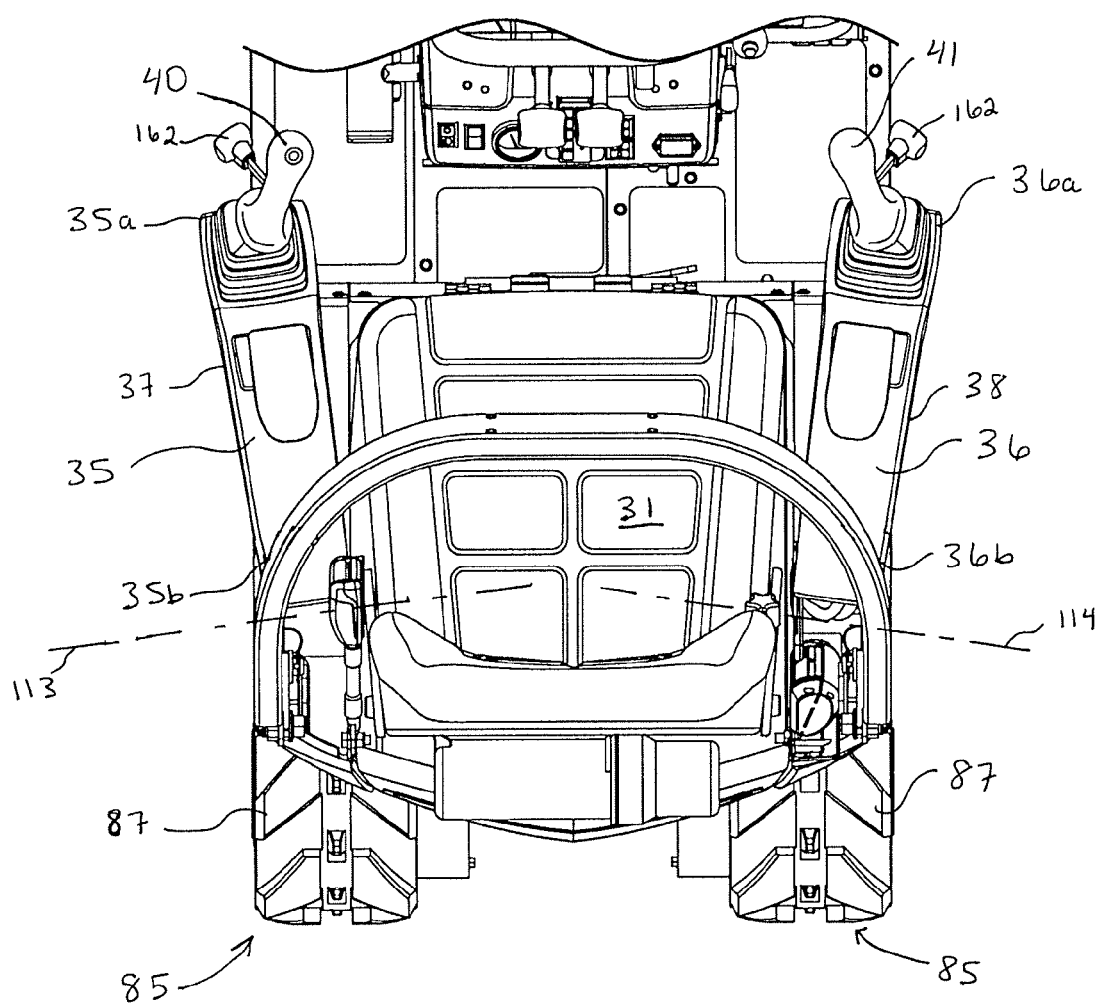
FIG. 4 is a top view of the vehicle of FIG. 1 with the pair of armrests in a first horizontal orientation.
Figure 5:
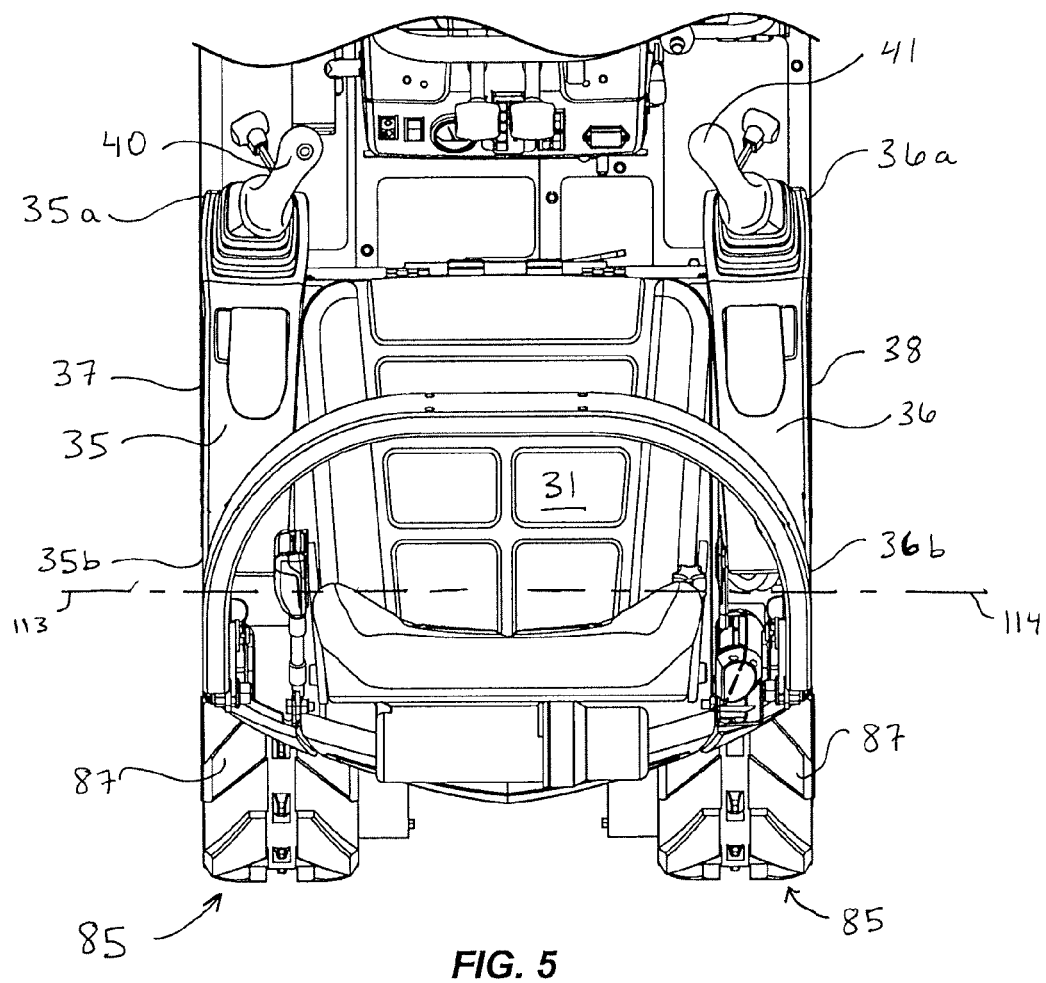
FIG. 5 is a top view of the vehicle of FIG. 1 with the pair of armrests in a second horizontal orientation.

As shown in FIGS. 4 and 5, the armrests 35, 36 are also pivotable between a first horizontal orientation and a second horizontal orientation. The first horizontal orientation, shown in FIG. 4, is the normal operating orientation, as it provides more space for an operator in the operator support 30. In the first horizontal orientation, the armrests 35, 36 protrude outwardly of or wider than a footprint of the vehicle 10. The footprint of the body 15 is defined as the outer perimeter of the body 15.

The armrests 35, 36 are pivotable about respective substantially vertical axes 115, 116, shown in FIG. 2. The substantially vertical axes 115, 116 are laterally spaced from one another and, in some embodiments, are parallel one another. In other, non-illustrated embodiments, the axes 115, 116 are angled relative to one another.

Figure 6:
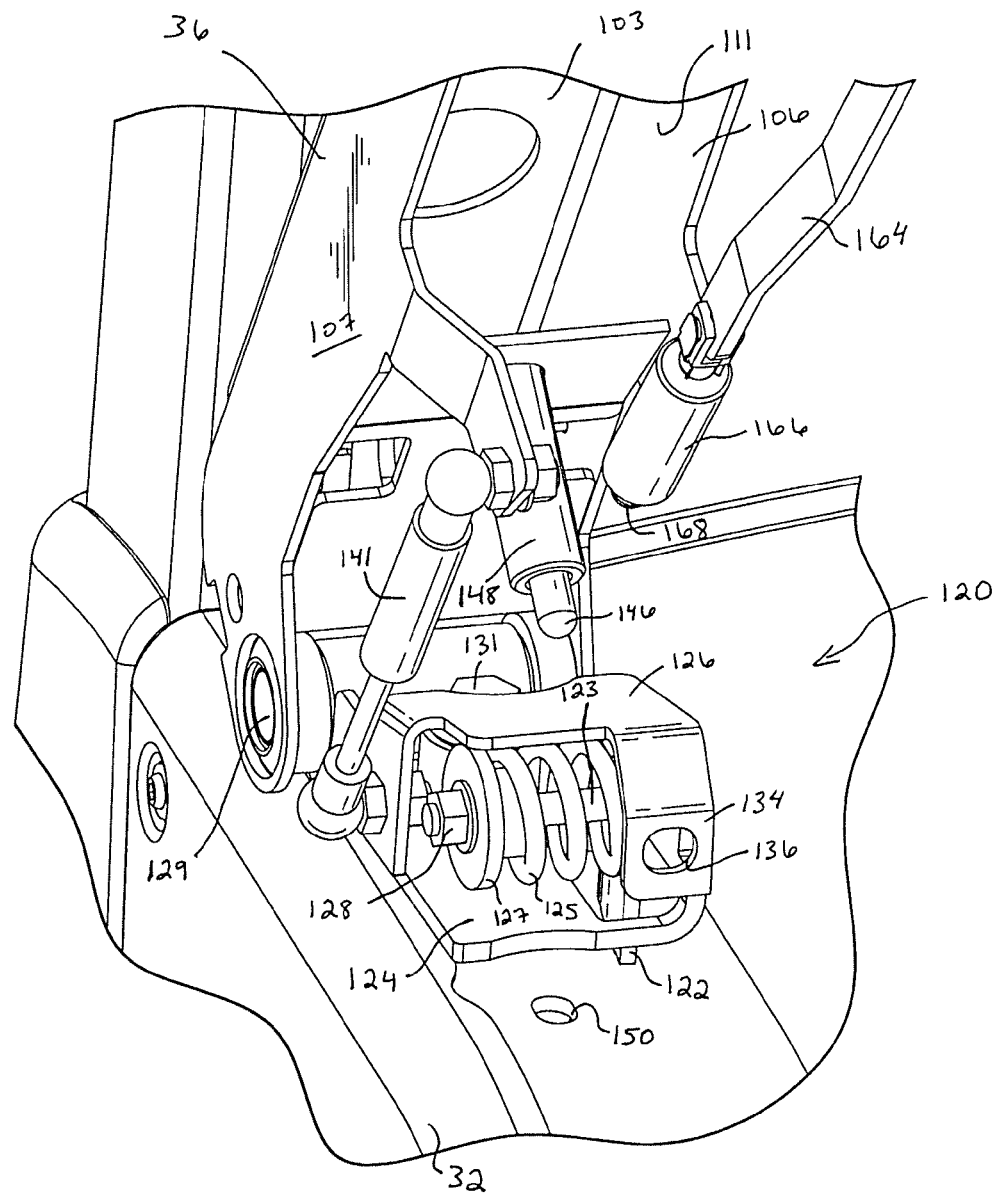
FIG. 6 is a close-up perspective of the armrest of FIG. 5 in the second horizontal orientation.
Figure 7:
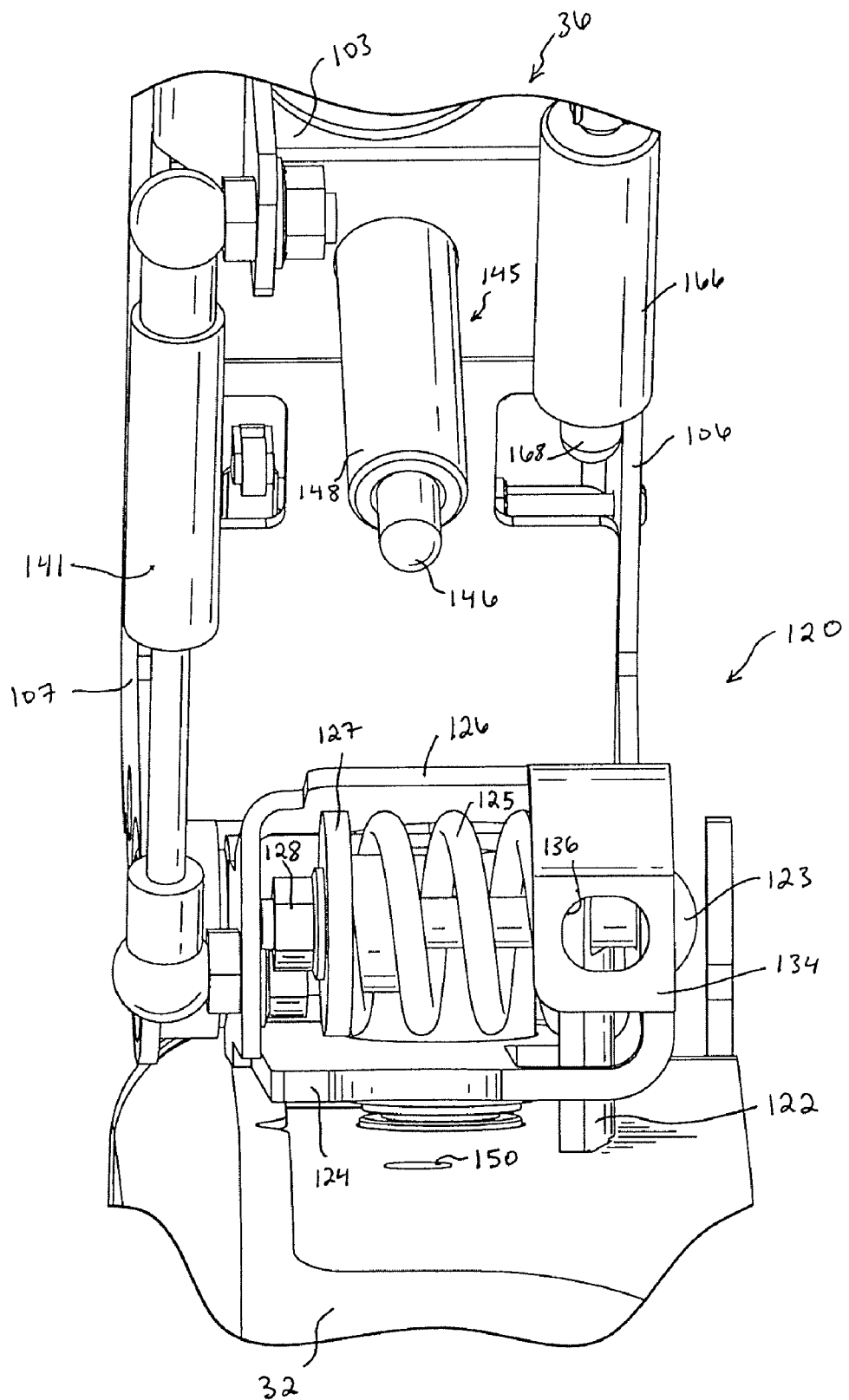
FIG. 7 is a close-up front view of the armrest of FIG. 5 in the second horizontal orientation.

As shown in FIGS. 6 and 7, the armrests 35, 36 are each coupled to the frame 32 through a bracket assembly 120 for accommodating vertical and horizontal pivoting movement of the armrests 35, 36. The construction and operation of the bracket assemblies 120 is substantially similar. Therefore, the construction and operation of the bracket assemblies 120 will be described with regard to the armrest 36. The bracket assembly 120 includes a frame upright 122, a fastener 123, a lower bracket 124, a first spring 125, an upper bracket 126, a horizontal pivot 129 and vertical pivot 131. The bracket assembly 120 is aligned with the armrest 36 and is concealed by the upper member 103 and side members 106, 107 within the channel 111 when the armrest 36 is in the first vertical orientation. The frame upright 122 extends vertically downward into the frame 32. The fastener 123 extends through the frame upright 122, the lower bracket 124 and the first spring 125. A washer 127 and a nut 128 are coupled to the fastener 123, such that the washer 127 abuts the first spring 125. The frame upright 122 is fixedly coupled to the frame 32, whereas the remaining portions of the bracket assembly 120 move horizontally with the armrest 36. The first spring 125 is compressed between the washer 127 and the frame upright 122. The fastener 123 engages the lower bracket 124 and abuts against the lower bracket 124. The first spring 125 biases the lower bracket 124 against the frame upright 122, thereby biasing the armrest 36 to the first horizontal position.

An operator can pivot the armrest 36 inward against the outward bias of the first spring 125. The horizontal pivot 129 extends horizontally and permits the armrests 35, 36 to pivot between the first and second vertical positions. The vertical pivot 131 extends vertically and permits the armrests 35, 36 to pivot between the first and second horizontal positions. The vertical pivot 131 is mounted to the frame 32 rearward of the frame upright 122 and extends through an aperture in the lower bracket 124. The upper bracket 126 is coupled to the lower bracket 124 and includes a forward facing portion 134 with an aperture 136 therethrough. The horizontal pivot 129 is coupled to the vertical pivot 131 rearwardly of the upper bracket 126. The side members 106, 107 of the armrest 36 are pivotally coupled to the horizontal pivot 129 at the second end 36*b*. The armrest 36 and the horizontal pivot 129 are pivotally movably about the vertical pivot 131 for moving between the first and second horizontal orientations.

The armrests 35, 36 are biased upward by a mechanism such as left and right gas springs 140, 141, as shown in FIG. 3. The gas springs 140, 141 are coupled between a mid portion of the side member of the armrest and the vertical pivot 131. The gas springs 140, 141 are positioned slightly over-center to retain the armrests 35, 36 downward when in the first vertical orientation. When the armrests 35, 36 are lifted slightly by an operator (i.e., pivoted about axes 113, 114 from the first vertical orientation toward the second vertical orientation), the gas springs 140, 141 bias the armrests 35, 36 upward.

FIGS. 6-11 show a horizontal latching mechanism 145 on armrest 36 for retaining the armrest in the first horizontal orientation. The latching mechanism 145 includes a protruding member or pin 146 extending downwardly from the armrest, a second spring 147 coupled to the pin 146 and a collar 148 positioned around pin 146 and the second spring 147. In the illustrated embodiment, the second spring 147 is a coil spring and is positioned around the pin 146 (shown in FIG. 10). In other embodiments, the second spring 147 is a leaf spring or other similar biasing member. An aperture 150 in the frame 32 is capable of receiving the pin 146.

Figure 8:
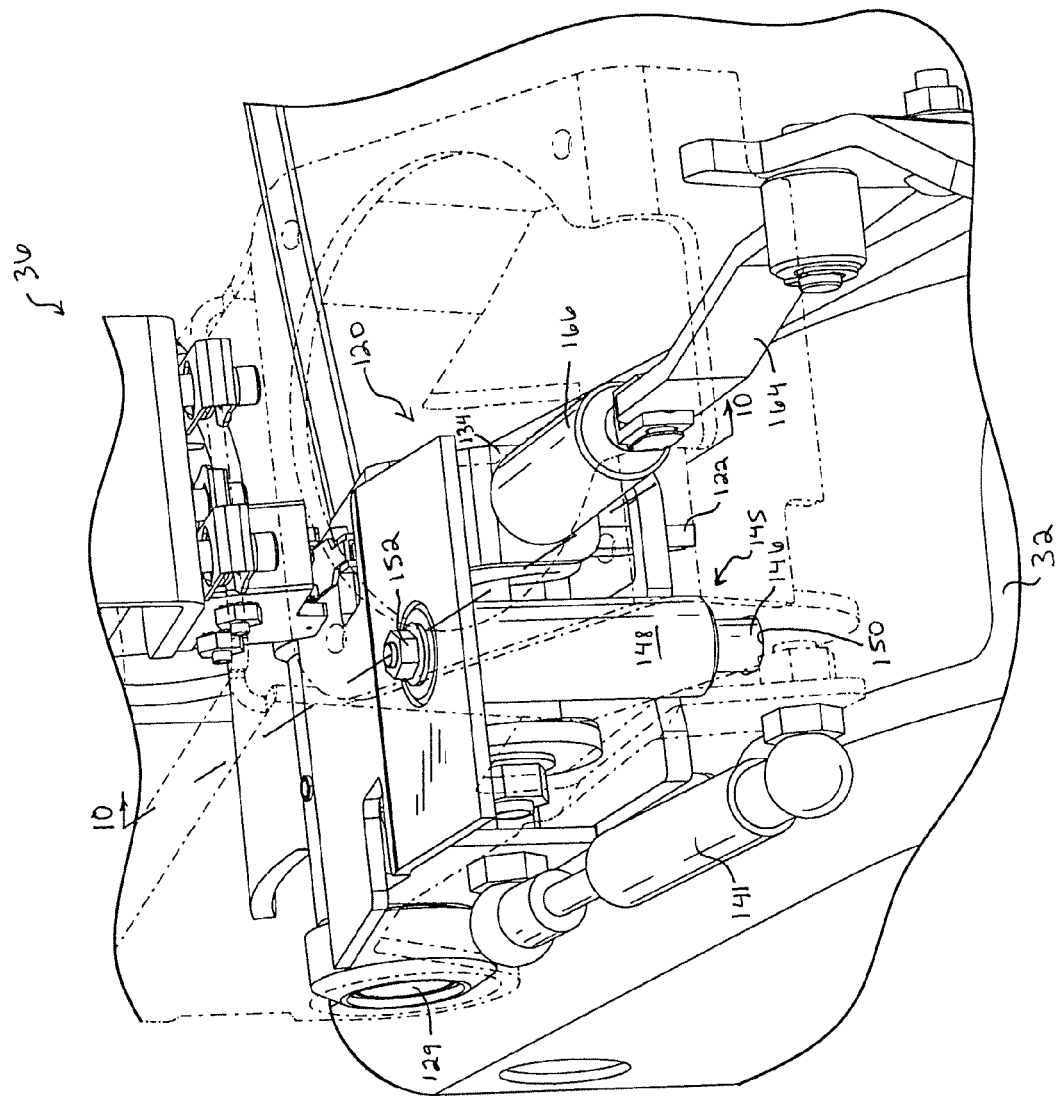
FIG. 8 is a close-up perspective view of one of the pair of armrests of FIG. 4 in the second horizontal orientation.
Figure 9:
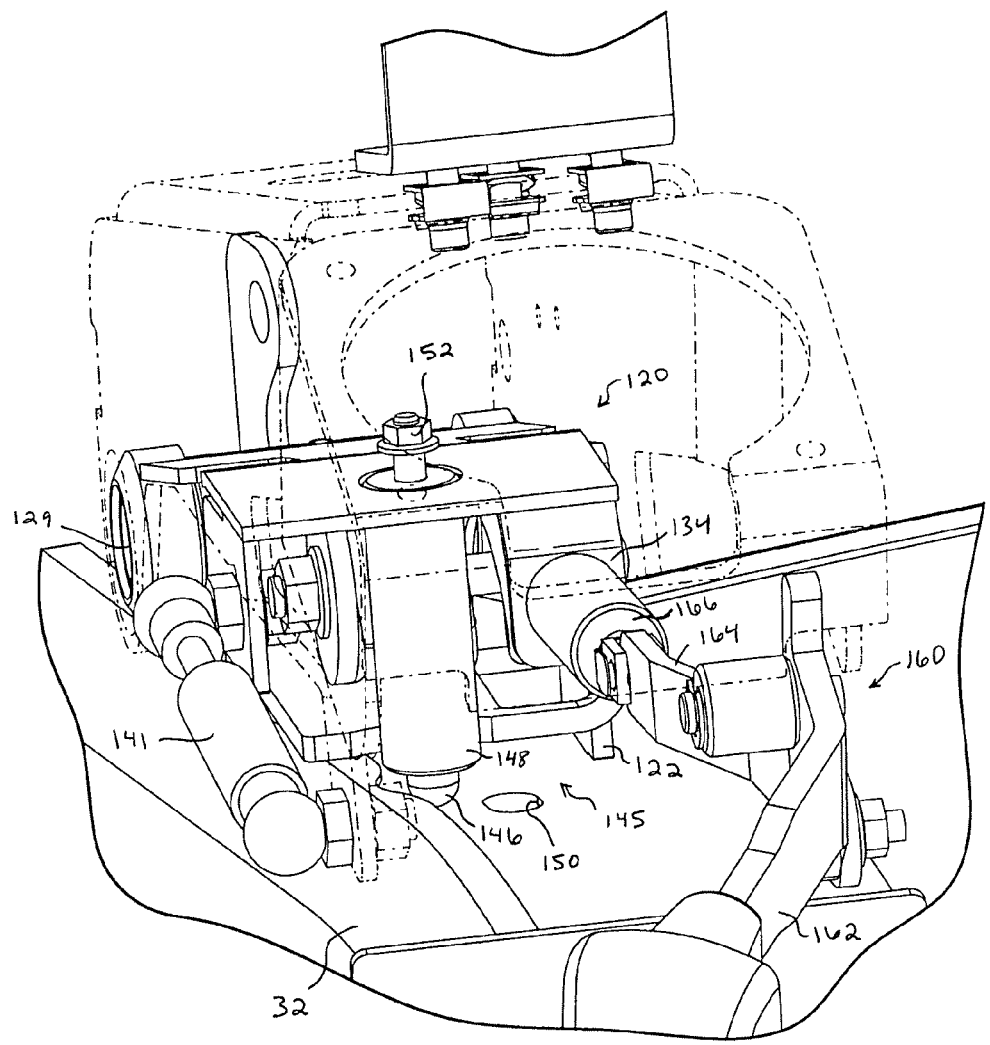
FIG. 9 is a close-up perspective view of one of the pair of armrests of FIG. 4 in the first horizontal orientation.
Figure 10:
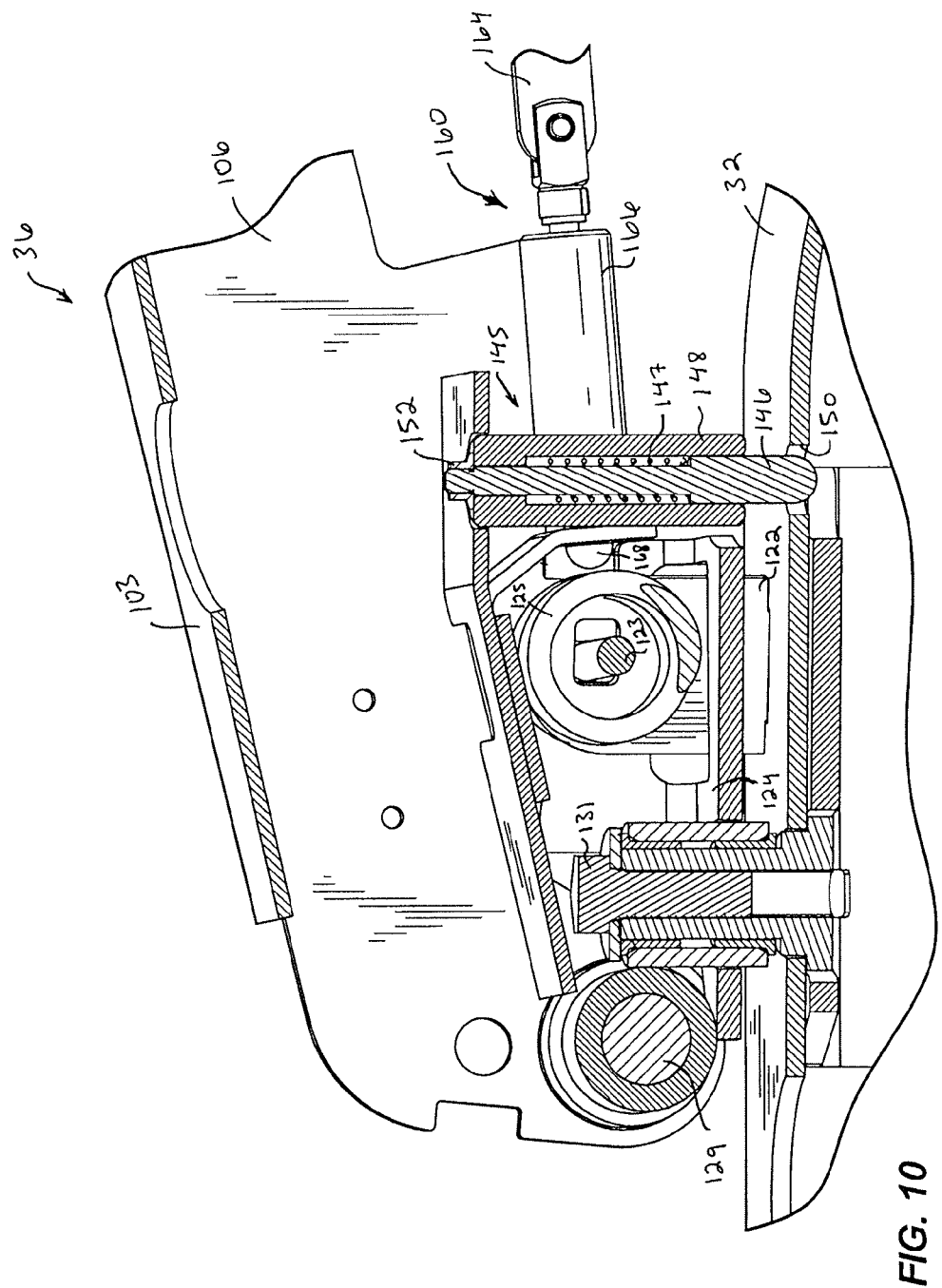
FIG. 10 is a cross-section view along line 10-10 of FIG. 8 of a portion of one of the pair of armrests.

FIGS. 8 and 10 show the armrest 36 in the second horizontal or narrow orientation. The armrest 36 is pivoted inward toward armrest 35 so the first end 36*a* is substantially parallel to the frame 32 and within footprint of the body 15, as shown in FIG. 5. When the armrest 36 is pivoted into the second horizontal orientation, the pin 146 is substantially aligned with the aperture 131. The second spring 147 biases the pin 146 into the aperture 131. The armrest 36 is inhibited from movement about the vertical axis 116 when the pins 146 are captured in the aperture 150. The pin 146 retains the armrest 36 in the second horizontal orientation until an operator pivots the armrest 36 upward at the second end 36b about axis 114 which disengages the pin 146 from the aperture 150. Then, the first spring 125 biases the armrest 36 outward about axis 116 into the first horizontal orientation, as shown in FIG. 9. In some embodiments, a nut 152 can be included on the pin 146 to retain the pin 146 in the collar 148 against the force of gravity. The nut 152 can permit movement of the pin 146 into the collar 148, as shown in FIGS. 8 and 9.

Figure 11:
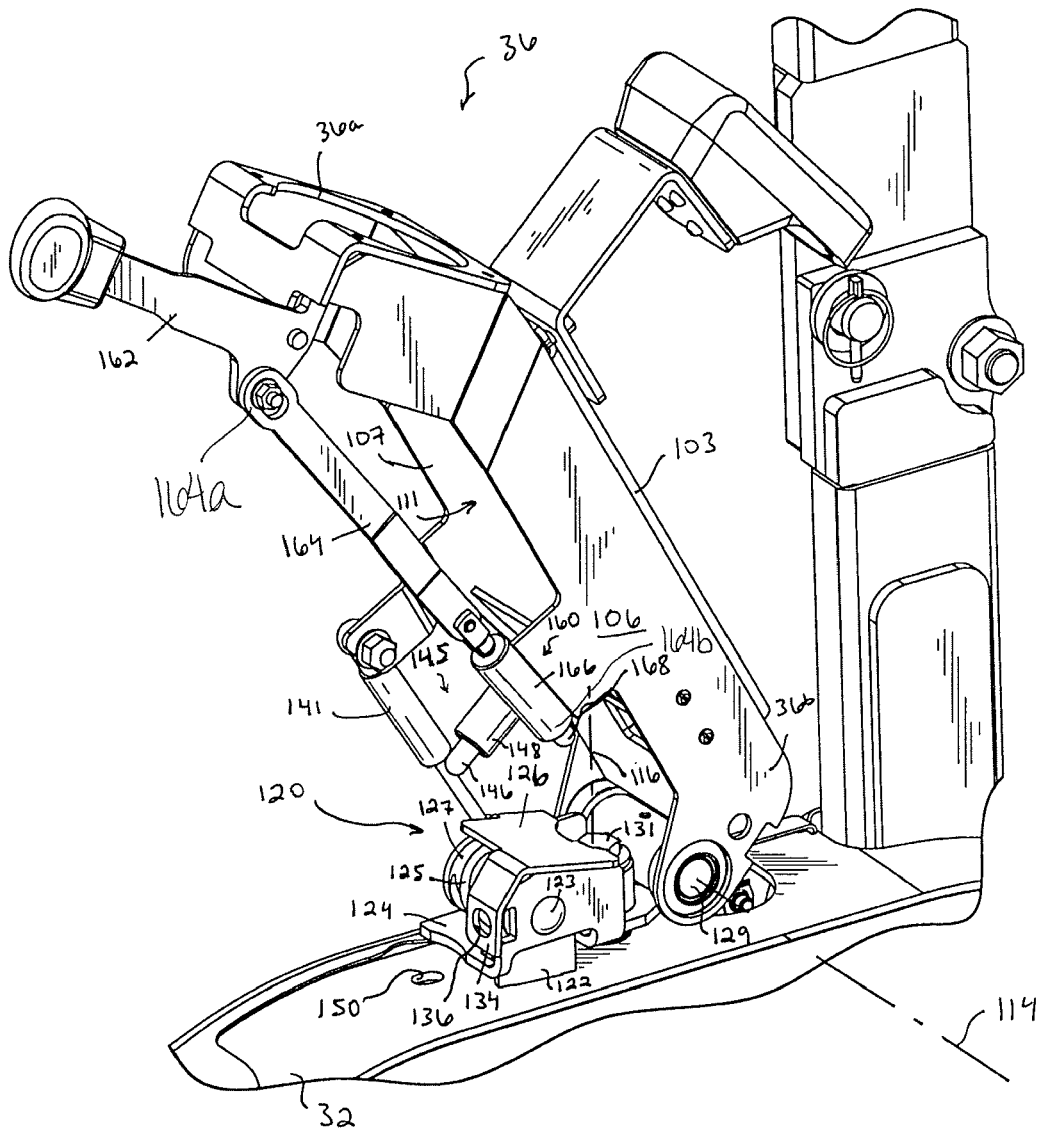
FIG. 11 is a close up view of the armrest of FIG. 3, and viewed from the inside of an operator compartment.

FIG. 11 shows a vertical latching mechanism 160 that can selectively lock the armrests 35, 36 in the first vertical orientation, to inhibit accidental elevation of the armrests 35, 36. The latching mechanism 160 is disengaged in FIGS. 6, 7 and 11, and is engaged in FIGS. 8-10. The latching mechanism 160 includes a handle 162, a link 164, a sleeve 166 and a pin 168. The handle 162 is pivotally coupled to the first end 36a of the armrest 36. The link 164 has a first end 164a pivotally coupled to the handle 162 and a second end 164b coupled to the pin 168. The pin 168 is slidably received in the sleeve 166. Pivoting the handle 162 actuates the link 164 for linear movement substantially parallel to the armrest 36, which in turn slides the pin 168 relative to the sleeve 166, which acts as a guide for the pin 168. In the first vertical orientation, the pin 168 is aligned with the aperture 136 in the forward facing portion 134 of the lower bracket 124. Pivoting the handle 162 downwardly moves the link 164 rearwardly, sliding the pin 168 into the aperture 136. The captured pin 168 inhibits vertical movement of the armrest 36. To release the latching mechanism 160, the handle 162 is pivoted upwardly to slide the link 164 forward, which disengages the pin 168 from the aperture 136.

In operation, when an operator desires to enter the excavator 10, the operator can pivot either or both armrests 35, 36 about respective axes 113, 114 from the first vertical orientation upward into the second vertical orientation, by disengaging the vertical latching mechanisms 160. When the armrests 35, 36 are in the second vertical orientation, the joysticks 40, 41 are non-operational so as to inhibit accidental actuation. The gas springs 140, 141 bias the armrests 35, 36 into the second vertical position to keep them there until the operator pushed them into the first vertical position. When the operator is seated on the operator support 30, the operator can pivot the armrests 35, 36 downward about the axes 113, 114 until the respective gas springs 140, 141 are positioned over-center to bias the armrest 35, 36 into the first vertical orientation. The vertical latching mechanisms 160 are re-engaged by pivoting the handles 162 downwardly to insert the pin 168 into the aperture 136. When the armrests 35, 36 are in the first vertical orientation, the joysticks 40, 41 are operational, such that the operator can control movement of the excavator 10, attachments etc.

The first horizontal or wide orientation provides a roomier and more comfortable seating and armrest support position for the operator. When an operator desires to proceed through a narrow passageway, such as a gate or a doorway, the operator can pull the armrests 35, 36 inward about axes 115, 116. When the pins 146 are aligned with the apertures 150, the pins 146 are biased into engagement with the apertures 150 by second springs 147 (FIG. 10). The captured pins 146 inhibit movement in a horizontal plane to retain the armrests 35, 36 in the second horizontal orientation. The armrests 35, 36 are positioned within the footprint of the vehicle 10, which can reduce the overall width of the vehicle 10. Once the excavator 10 has moved through the narrow passageway, the operator can lift the armrests 35, 36 (i.e., pivot up about axes 113, 114) to remove pins 146 from apertures 150, and allow first springs 125 (FIG. 6) to bias the armrests 35, 36 outward into the first horizontal orientation. The joysticks 40, 41 and other controls can remain engaged in both the first and the second horizontal orientations.

In one embodiment, when the armrests 35, 36 are in the second horizontal orientation, the overall width of the excavator 10 is about 700 mm (27.5 in). In another embodiment, the overall narrow width is about 710 mm (28 in). In yet another embodiment, the overall narrow width is about 730 mm (28.7 in). In yet another embodiment, the overall narrow width is slightly less than 800 mm (31.5 in). Therefore, the overall width of the vehicle 10 can be adjusted by adjusting the position of the armrests 35, 36.

In one embodiment, when the armrests 35, 36 are in the first horizontal orientation, the overall width is only slightly wider than 710 mm (27.5 in). In another embodiment, the overall wide width is about 730 mm (28.7 in). In yet another embodiment, the overall wide with is slightly greater than 800 mm (31.6 in). In a further embodiment, the overall wide width is about 915 mm (36 in). These widths are given by way of example only and are not intended to be construed as limiting to the claims.

Various features and advantages of the invention are set forth in the following claims.

What is claimed is:

1. An operator control assembly for a construction vehicle, the operator control assembly comprising:
    an operator manipulable control;
    a first armrest movably coupling the operator manipulable control to a frame of a construction vehicle, the first armrest being movable from a first vertical orientation to a second vertical orientation and from a first horizontal orientation to a second horizontal orientation, wherein when the first armrest is in the second horizontal orientation, the first armrest is positioned within a footprint of the vehicle; and
    a coupling assembly for coupling the first armrest to the frame, the coupling assembly including a first spring and a pin, the coupling assembly configured such that when the first armrest is moved into the second horizontal orientation the pin and the aperture are substantially in alignment such that the first spring biases the pin into the aperture to inhibit movement of the first armrest from the second horizontal orientation until the first armrest is moved upward to disengage the pin from the aperture.

2. The operator control assembly of claim 1, wherein the operator control is operable to control operation of the construction vehicle when the first armrest is in the first and second horizontal orientations, and when the first armrest is in the first vertical orientation, but the operator control is not operable to control operation of the construction vehicle when the first armrest is in the second vertical orientation.

3. The operator control assembly of claim 1, wherein the first armrest is in the first horizontal orientation for construction vehicle work and is in the second horizontal orientation for construction vehicle travel.

4. The operator control assembly of claim 1, further comprising a second armrest coupled to the frame of the construction vehicle, the second armrest being movable from a first vertical orientation to a second vertical orientation and from a first horizontal orientation to a second horizontal orientation.

5. The operator control assembly of claim 4, wherein a first end of the first armrest and a first end of the second armrest are spaced apart a first horizontal distance in the first horizontal orientation and a second horizontal distance in the second horizontal orientation.

6. The operator control assembly of claim 4, wherein in the first horizontal orientation the first armrest is angled relative to the second armrest, and in the second horizontal orientation the first armrest is substantially parallel to the first armrest.

7. The operator control assembly of claim 1, further comprising a second spring that biases the first armrest into the first horizontal orientation and wherein the first armrest is coupled to an operator support at a rear portion of the armrest and is pivotable about the rear portion of the armrest.

8. A seating assembly for a construction vehicle, the seating assembly comprising:
  an operator seat;
  a frame supporting the operator seat;
  a first armrest movably coupled to the frame, the first armrest being movable from a first vertical orientation to a second vertical orientation and from a first horizontal orientation to a second horizontal orientation;
  an operator manipulable control coupled to the first armrest; and
  a coupling assembly for coupling the first armrest to the frame, the coupling assembly including a first spring and a pin, the coupling assembly configured such that when the first armrest is moved into the second horizontal orientation the pin and the aperture are substantially in alignment such that the first spring biases the pin into the aperture to inhibit movement of the first armrest from the second horizontal orientation until the first armrest is moved upward to disengage the pin from the aperture.

9. The seating assembly of claim 8, further comprising a second armrest movably coupled to the frame on an opposite side of the operator seat as the first armrest, the second armrest being movable from the first vertical orientation to the second vertical orientation and from the first horizontal orientation to the second horizontal orientation.

10. The seating assembly of claim 9, wherein the first armrest and the second armrest are horizontally spaced apart from one another a first distance in the first horizontal orientation and a second distance different from the first distance in the second horizontal orientation.

11. The seating assembly of claim 9, wherein the first armrest is angled relative to the second armrest in the first horizontal orientation, and the first armrest is parallel to the second armrest in the second horizontal orientation.

12. The seating assembly of claim 9, wherein the first armrest and second armrest extend outside a footprint of the frame in the first horizontal orientation, and the first armrest and the second armrest are positioned within the footprint of the frame in the second horizontal orientation.

13. The seating assembly of claim 9, wherein a first free end of the first armrest and a first free end of the second armrest are spaced apart a first horizontal distance in the first horizontal orientation and a second horizontal distance in the second horizontal orientation, the first horizontal distance being greater than the second horizontal distance.

14. The seating assembly of claim 8, further comprising a second spring that biases the first armrest into the first horizontal orientation and wherein the first armrest is coupled to an operator support at a rear portion of the armrest and is pivotable about the rear portion of the armrest.

15. The seating assembly of claim 8, wherein the operator manipulable control is operable to control operation of the construction vehicle when the first armrest is in the first and second horizontal orientations, and when the first armrest is in the first vertical orientation, but the operator manipulable control is not operable to control operation of the construction vehicle when the first armrest is in the second vertical orientation.

16. A method of adjusting an armrest on a construction vehicle, the method comprising:
  pivoting the armrest upward from a first vertical orientation into a second vertical orientation prior to entering the vehicle;
  disengaging controls from the armrest when in the second vertical orientation;
  pivoting the armrest downwards into the first vertical orientation;
  engaging the controls and the armrest when in the first vertical orientation;
  pivoting the armrest horizontally inward from a first horizontal orientation into a second horizontal orientation;
  inserting a pin into an aperture in the armrest;
  retaining the armrest in the second horizontal orientation using the pin inserted into the aperture in the armrest to inhibit movement of the armrest toward the first horizontal orientation;
  pivoting the armrest upward;
  removing the pin from the aperture in the armrest as a result of pivoting the armrest upward to disengage the pin from the aperture to allow movement of the armrest toward the first horizontal orientation; and
  biasing the armrest outward into the first horizontal orientation after removing the pin from the aperture by pivoting the armrest upward.

* * * * *